Nov. 4, 1952  J. L. HIGHT  2,616,748
AUTOMATIC LOAD RELEASING DEVICE FOR PARACHUTES
Filed Jan. 17, 1951  3 Sheets—Sheet 1

INVENTOR.
JAMES L. HIGHT

Nov. 4, 1952     J. L. HIGHT     2,616,748

AUTOMATIC LOAD RELEASING DEVICE FOR PARACHUTES

Filed Jan. 17, 1951     3 Sheets-Sheet 2

INVENTOR.
JAMES L. HIGHT
BY Wade Koontz AND
ATTORNEY
Charles L. Burgoyne.
AGENT.

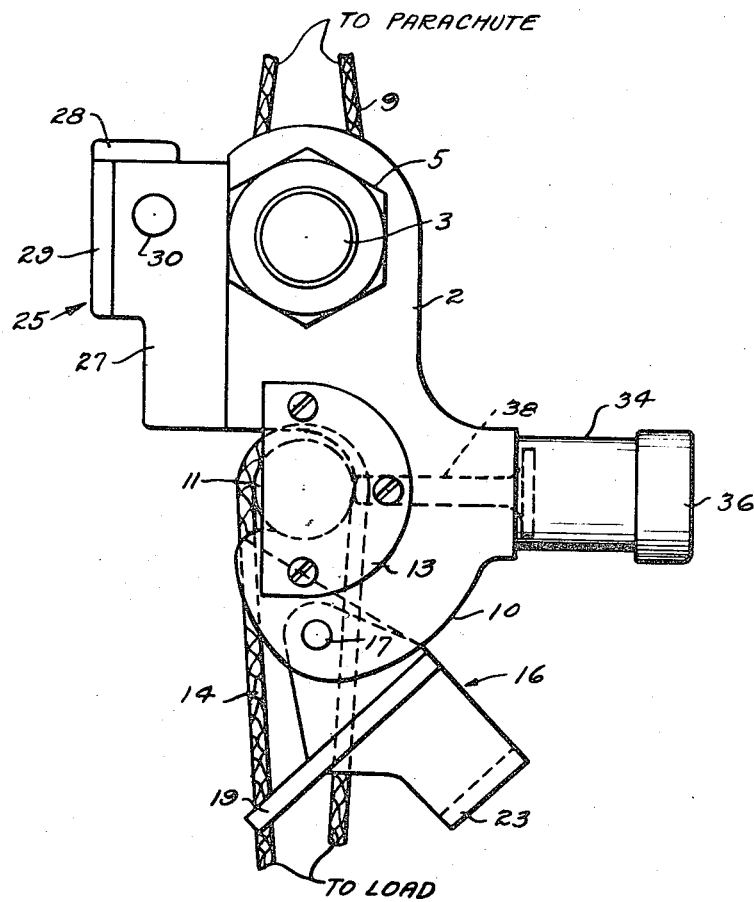

Patented Nov. 4, 1952

2,616,748

UNITED STATES PATENT OFFICE 2,616,748

AUTOMATIC LOAD RELEASING DEVICE FOR PARACHUTES

James L. Hight, Dayton, Ohio

Application January 17, 1951, Serial No. 206,412

6 Claims. (Cl. 294—83)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an automatic load releasing device for parachutes, and particularly to a load releasing device effective to release the parachute from the load when the load reaches the ground.

The primary object of the invention is to provide a releasable connector assembly for attaching a parachute to a load and to provide in the assembly means to positively prevent release of the load while the parachute and load are being stabilized and to further provide means in the assembly to release the parachute from the load upon ground contact by the load.

A further object of the invention is to provide a releasable connector assembly for attaching a parachute to a load and to provide in the assembly means to positively prevent release of the load for a predetermined time interval after the load and parachute have been ejected from a cargo aircraft and to further provide means to cause automatic release of the parachute from the load upon ground contact by the load.

Another object of the invention is to provide a releasable connector assembly for parachute carried loads including a hook-like support having a depressed bight portion to receive a releasable load-carrying pin and further including means to positively prevent release of the pin for a predetermined time interval after the load and parachute have been ejected from a cargo aircraft and still further including means to cause automatic release of the parachute from the load upon ground contact by the load.

Another object of the invention is to provide an automatic load releasing device for parachutes having a maximum degree of reliability and requiring a minimum of adjustment and service for proper functioning.

The above and other objects of the invention will become apparent upon reading the following detailed description in conjunction with the accompanying drawings, in which:

Fig. 5 is a side elevation view of the load releasing device after the securing bars have moved to a non-securing position but before the parachute supported load has touched the ground.

The present load releasing device for parachutes is of general utility in effecting an automatic release of a parachute or cluster of parachutes from a load when the load touches the ground but is of particular utility in releasing parachutes from vehicles and howitzers in the aerial delivery of such equipment. As explained in my copending patent application Serial No. 182,389, filed on August 30, 1950, there have been many refinements in the technique of delivery of complete vehicles from cargo carrying aircraft. The above identified application now matured into Patent No. 2,557,105 discloses part of the necessary equipment required and particularly discloses a shock absorbing crash frame for wheeled vehicles. The present application discloses a connector assembly adapted for attachment both to a parachute and to a load and the assembly is so constructed as to cause release of the parachute from the load as the load touches the ground. The parachute thus released may blow away before collapsing, without causing the vehicle or other load to upset due to sidewise tipping forces.

Connector assembly

Figure 1:
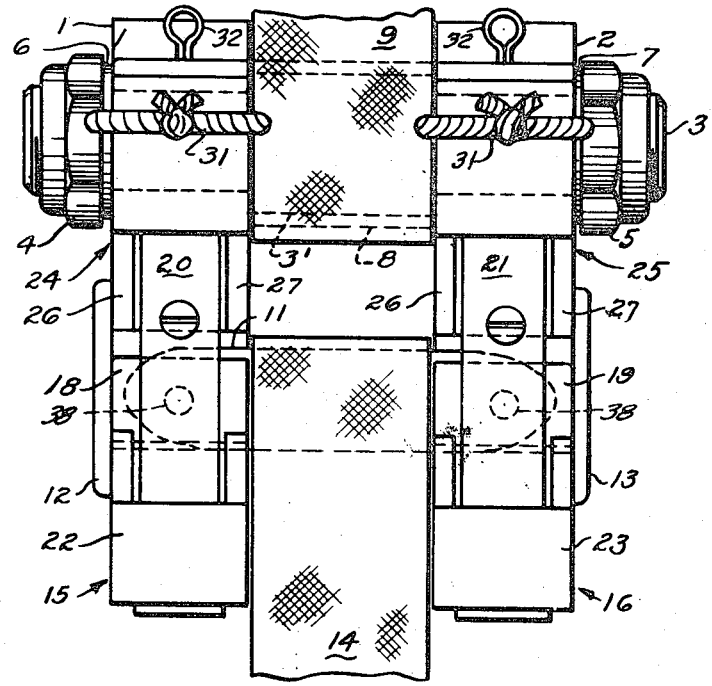
Fig. 1 is a front elevation view of the load releasing device with the parachute and load attached straps in place.
Figure 2:
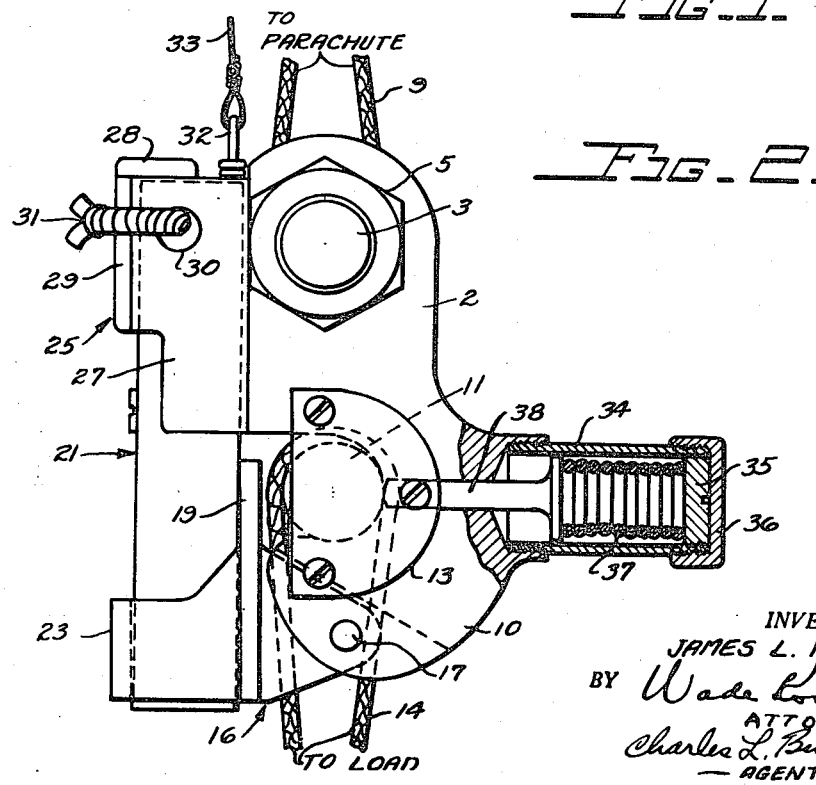
Fig. 2 is a side elevation view of the load releasing device with the parachute and load attached straps in place.

For a detailed description of the invention reference is first made to Figs. 1 and 2 of the drawings. The releasable connector or load releasing device includes in its preferred form a pair of spaced parallel body members 1 and 2 connected at their upper ends by a cross-pin 3 received in holes at the upper ends of the body members and having opposite threaded ends to retain castellated nuts 4 and 5. The central portion 3' of cross-pin 3 is of enlarged cross section to form oppositely facing annular shoulders against which the body members 1 and 2 are held by the nuts 4 and 5. Between the nuts 4 and 5 and body members 1 and 2 are washers 6 and 7. Around the central enlarged section 3' of the pin 3 is a freely rotatable collar 8 to lessen the chances for frictional burning of the parachute attached strap or web 9 and also to increase the radius of bend of the strap 9 where it loops under the cross-pin.

Toward the lower end each body member is notched out to form a hook-like support 10 to eceive the opposite ends of another cross-pin 11 having opposite rounded ends. The pin 11 is prevented from appreciable endwise movement by the semicircular end plates 12 and 13 attached to the body members by short screws. Looped over the cross-pin 11 is a load attached strap or web 14 extending downwardly to a parachute supported load, such as a vehicle or howitzer mounted on a light platform. The weight of the load on the loose pin 11 holds it down tightly in the shallow depression or bight formed in the upper side of each hook-like support 10 while the load is descending after being ejected from an airplane with the parachute attached thereto. It is especially necessary to maintain the pin 11 within the confines of the hook-like supports 10 immediately after the load has been ejected from the airplane because the load and parachute usually oscillate violently at first. During these oscillating movements the pin 11 might be dislodged from the hook-like supports 10 if some special securing means were not provided. This securing or blocking means takes the form of swinging members 15 and 16, one of which is mounted at the lower end of each body member as by use of pivot means 17. Forming an integral part of the members 15 and 16 are the plate-like portions 18 and 19 which form guides for the securing bars 20 and 21 in conjunction with the channel portions 22 and 23 integrally connected to the plate-like portions 18 and 19. The upper ends of the securing bars 20 and 21 are guided by housing portions 24 and 25 integrally connected to the respective body members 1 and 2. These housing portions comprise similar parallel side walls 26 and 27, which may be welded to the body members, a top wall 28 and a forward or front wall 29. The top wall and front wall may also be welded in place as shown. A hole 30 extending through the side walls of housing portions 24 and 25 and through each securing bar 20 and 21 accommodates a tied loop of heavy cord 31, to maintain the securing bars in the uppermost position. The tied loops are adapted to be cut by means contained in the securing bars and this means is energized by removal of slide pins each including a loop 32 adapted to be actuated by static line 33 fastened to the airplane frame. When the cords 31 are cut, the bars 20 and 21 drop downwardly out of the housing portions 24 and 25 whereupon the swinging members 15 and 16 swing downwardly to the position as shown in Fig. 5.

Secured to the rearward side of each body member 1 and 2 is a cylindrical casing 34 closed at the outer end by a screw plug 35 and screw cap 36. Within the casing 34 is a compression spring 37 for biasing the pin ejecting plunger 38 into engagement with the loose pin 11. The strength of the spring is so chosen that the plunger 38 can act to push the loose pin 11 out of engagement with the body members only when the load reaches the ground and the load component on the loose pin 11 is suddenly reduced. It is further noted that the rounding of the opposite ends of loose pin 11 serves a useful purpose. In case only one of the securing bars 20 and 21 functions to cut its associated tied loop 31 and drop to the non-securing position, the pin 11 will be ejected at the free end by action of the plunger 38 bearing thereon and the other end of the pin can then pull free in an endwise direction. Thus it will be clear that the smoothly rounded ends of the pin 11 allow this twisting action of the pin and ready release even though only one securing bar has functioned in the desired manner to clear the open side of the hook-like support 10.

Securing bar construction

Figure 4:
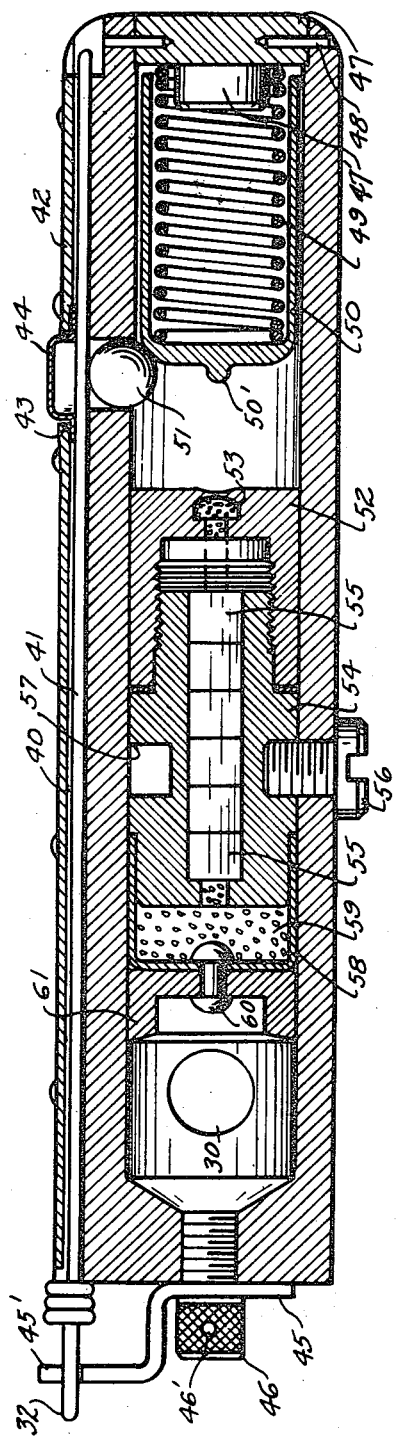
Fig. 4 is a longitudinal cross section of the cutter-containing securing bar as shown in Fig. 3.
Figure 3:
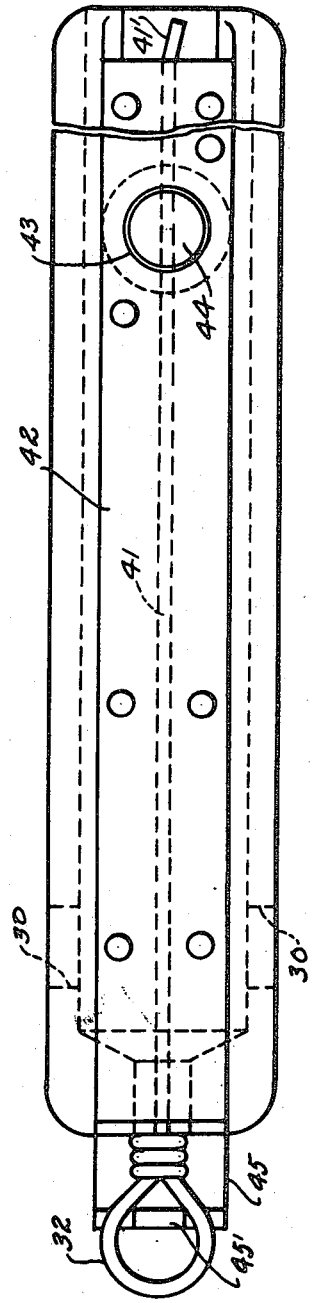
Fig. 3 is a plan view to an enlarged scale of the cutter-containing securing bar forming a vital part of the present load releasing device.

The securing bars 20 and 21 are shown in detail in Figs. 3 and 4 to a scale about double actual size. In external appearance each bar is a smooth, metallic elongated element of square cross-sectional shape and having a minimum of projections on the outer faces thereof. The bar is machined from steel bar stock and includes a central longitudinal groove 40 along one face to receive the slide wire 41 having the loop 32 at one end. A shallow longitudinal recess along the bar provides a space to receive a thin groove-covering strip 42 pinned securely to the bar itself. An aperture 43 in the strip 42 is filled by a flanged cup 44 held down by the strip itself and providing a recess to receive a ball detent when the slide pin 41 is pulled free of the bar. The pin 41 has one end 41' normally bent slightly to resist removal of the pin. In practice the bend should be of such proportions to require a 10 to 25 pound pull for release from the bar by sliding through the groove 40. At the end of the bar adjacent to loop 32 there is provided a safety clip 45 having a tongue 45' extending through the loop 32. The clip includes an apertured base portion attached to the bar by a thumb screw 46 threading axially into the bar. Before the bar goes into service the screw 46 and clip 45 are removed. When quantities of the bars are shipped there should be a sealing wire through the aperture 46' in the screw 46 and looped around the clip 45.

The bar is longitudinally bored out throughout most of its length and after the cutter mechanism is inserted the bore is closed by a round plug 47 secured in place by transverse pins 48. The plug 47 carries a spring positioning boss 47' and the associated compression spring 49 extends into a cup-like detonator 50 including a detonating projection 50' on the closed end. The detonator is maintained in the cocked position by a ball detent 51 normally held part way inside the central bore by the slide wire 41. Spaced from the detonator is a detonating charge retainer 52 having a detonating charge 53 enclosed therein. The retainer 52 is threaded over a powder magazine 54 having a central bore to contain a series of slugs 55 of slow burning powder. The assembled members 52 and 54 are held in relatively stationary position by a screw 56 threaded into the bar itself and extending into an annular groove 57 in the member 54. Between the member 54 and an adjacent cup 58 is a propelling powder charge 59 touched off after the contiguous powder slug 55 has burned through. Attached to the end wall of the cup 58 by means of rivet 60 is a hollowed-out cord cutter 61 adapted to shear a cord extending through the transverse hole 30. The manner in which the cutter mechanism functions is obvious but it should be noted that in the present application thereof, the slow burning powder charge used in slugs 55 is so compounded as to require ten seconds to burn from one end to the other of the charge. Thus from the time the detent releasing wire 41 is pulled from the bar until the propelling charge 59 is set off to fire the cutter 61 there is a period of about 10 seconds. This time period may be changed to some extent but is preferably in-

Summary of operation

Returning now to Figs. 1 and 2 the connector assembly is shown in the position it will assume after the parachute and load have become stabilized. However in normal operation the slide wires 41 carrying loops 32 will have been pulled out immediately after the load and connected parachute were ejected from the aircraft since the static lines 33 are made fast to the aircraft frame. Assuming now that the slide wires 41 are suddenly jerked from the securing bars 20 and 21, the cord cutters 61 inside the bars will cut the tied loops 31 about ten seconds later. By this time the parachute and load are fairly stable and of course the parachute is fully open. After the loops 31 are cut these loops fall away and the bars 20 and 21 are free to slide downwardly in their guides at least as far as the projecting head of screw 59 will allow them to slide. The upper ends of the bars will now clear the forward wall 29 of housing portions 24 and 25, and the pivoted members 15 and 16 will swing forwardly and downwardly to the position of Fig. 5. Now the forward open sides of the hook-like portions 10 will not be closed by the wall elements 18 and 19 and the loose pin 11 will be retained in the bight of the hook portions only by the weight of the load pulling downwardly with great force. The parachute descent will continue until the load touches the ground and when this happens the force pulling downwardly on the pin 11 will be reduced very substantially. After the load has come to rest on the ground the force on the pin 11 will be due only to the action of wind on the parachute and in large parachutes as used in aerial delivery of vehicles this force may be considerable. Now there will be a reduced force component tending to hold the pin 11 in the bight of the hook portions 10 and the transversely biased plungers 36 will immediately eject the opposite ends of pin 11 laterally out of the connector assembly, thus freeing the parachute from the load so that the parachute can blow to one side before collapsing and also eliminating the risk of upsetting the load due to tipping forces induced by the parachute. The load, whether a vehicle or other item of equipment, is ready to be put to immediate use when it is freed of various straps and securing devices. While it is indicated that the straps connecting the assembly to the parachute and to the load are woven webbing, it is often preferred to use steel strapping because of its superior resistance to the shock incurred when the parachute opens up.

The embodiments of the invention herein shown and described are to be regarded as illustrative only and it is to be understood that the invention is susceptible of variations, modifications and changes within the scope of the appended claims.

I claim:

1. A parachute load connector comprising, a body member including means at the upper end thereof to connect a parachute to the body member, a hook-like portion at the lower end of said body member providing an upwardly and forwardly opening recess to receive a transverse load-carrying pin, a pin-ejecting plunger slidably mounted on said body member for movement transversely thereof and having an outer end normally engaging said load-carrying pin along one side thereof, spring means acting to bias said pin-ejecting plunger in a direction to move said pin out of said recess, securing means movably mounted on said body member to close said recess and prevent ejection of said pin therefrom, means to retain said securing means in the recess closing position, and means operable after a predetermined time period following release of the parachute and load from an aircraft for releasing said securing means for movement to a position in which said recess is no longer closed thereby.

2. A parachute load connector comprising, a body member including means at the upper end thereof to connect a parachute to the body member, a hook-like portion at the lower end of said body member providing an upwardly and forwardly opening recess to receive a transverse load-carrying pin, pin-ejecting means movably mounted on said body member and having a portion normally engaging said load-carrying pin along one side thereof, spring means acting to bias said pin-ejecting means in a direction to move said pin out of said recess, securing means pivotally mounted on said body member to close said recess and prevent ejection of said pin therefrom, means to retain said securing means in the recess closing position, and means operable after a predetermined time period following release of the parachute and load from an aircraft for releasing said securing means for movement to a position in which said recess is no longer closed thereby, whereby said pin-ejecting means acts to eject said load-carrying pin from said recess when the parachute supported load attached to said pin reaches the ground and said load is no longer effective to hold said pin in said recess against the force of said pin-ejecting means.

3. A parachute load connector comprising, a body member including means at upper end thereof to connect a parachute to the body member, a hook-like portion at the lower end of said body member providing an upwardly and forwardly opening recess to receive a transverse load-carrying pin, pin-ejecting means movably mounted on said body member and having a portion normally engaging said load-carrying pin along one side thereof, spring means acting to bias said pin-ejecting means in a direction to move said pin out of said recess, a securing member pivotally mounted on said body member to close said recess and prevent ejection of said pin therefrom, means to retain said securing member in the recess closing position including a slidable bar carried by said securing member, means including a loop of cord passing through said slidable bar to retain said bar in a position for retaining said securing member in the recess closing position, cord cutting means contained in said slidable bar, and means operable after a predetermined time period following release of the parachute and load from an aircraft for energizing said cord cutting means to cut said loop of cord and thus release said securing member for movement to a position in which said recess is no longer closed thereby.

4. A parachute load connector comprising, a body member including means at the upper end thereof to connect a parachute to the body member, a hook-like portion at the lower end of said body member providing an upwardly and forwardly opening recess to receive a transverse load-carrying pin, a securing member pivotally mounted on said body member at the lower end of said body member to close said recess and prevent removal of said pin therefrom, means to retain said securing member in the recess closing position including a latching member movably mounted with respect to said securing member, and means operable after a predetermined time period following release of the parachute and load from an aircraft for releasing said retaining means and thus allowing downward pivotal movement of said securing member to a postion in which said recess is no longer closed thereby.

5. A parachute load connector comprising, a body member including means at the upper end thereof to connect a parachute to the body member, a hook-like portion at the lower end of said body member providing an upwardly and forwardly opening recess to receive a transverse load-carrying pin, a securing member pivotally mounted on said body member to close said recess and prevent removal of said pin therefrom, means to certain said securing member in the recess closing position including a slidable bar carried by said securing member and a housing portion carried by said body member, means including a loop of cord passing through said slidable bar and said housing portion to retain said bar in a position for locking said securing member in the recess closing position, cord cutting means contained in said slidable bar, and means operable after a predetermined time period following release of the parachute and load from an aircraft for energizing said cord cutting means to cut said loop of cord and thus release said securing member for movement to a position in which said recess is no longer closed thereby.

6. A parachute load connector comprising, a body member including means at the upper end thereof to connect a parachute to the body member, a hook-like portion at the lower end of said body member providing an upwardly and forwardly opening recess to receive a transverse load-carrying pin, a securing member pivotally mounted on said body member to close said recess and prevent removal of said pin therefrom, means to retain said securing member in the recess closing position including a slidable bar carried by said securing member and a housing portion carried by said body member, means including a loop of cord passing through said slidable bar and said housing portion to retain said bar in a position for locking said securing member in the recess closing position, cord cutting means contained in said slidable bar, cutter energizing means contained in said slidable bar, and means operable by a static line secured to an aircraft to cause actuation of said cutter energizing means after a predetermined time period following release of the parachute and load from the aircraft to cut said loop of cord and thus release said securing member for movement to a position in which said recess is no longer closed thereby.

JAMES L. HIGHT.

REFERENCES CITED

The following references are of record in the file of this patent:

UNITED STATES PATENTS

| Number | Name | Date |
|---|---|---|
| 2,386,932 | Cooper | Oct. 16, 1945 |
| 2,400,165 | Porter | May 4, 1946 |
| 2,414,023 | Cooper | Jan. 7, 1947 |
| 2,421,152 | Jones | May 27, 1947 |
| 2,422,839 | Maskey | June 24, 1947 |
| 2,424,215 | Anderson | July 22, 1947 |
| 2,534,704 | Frieder et al. | Dec. 19, 1950 |